Feb. 21, 1967   P. STRUTYNSKI   3,304,737
AUTOMATIC FILLER FOR ICE CREAM FREEZER
Filed Jan. 10, 1966   4 Sheets-Sheet 1

INVENTOR.
PETER STRUTYNSKI
BY
Watson D. Harbaugh
ATT'Y.

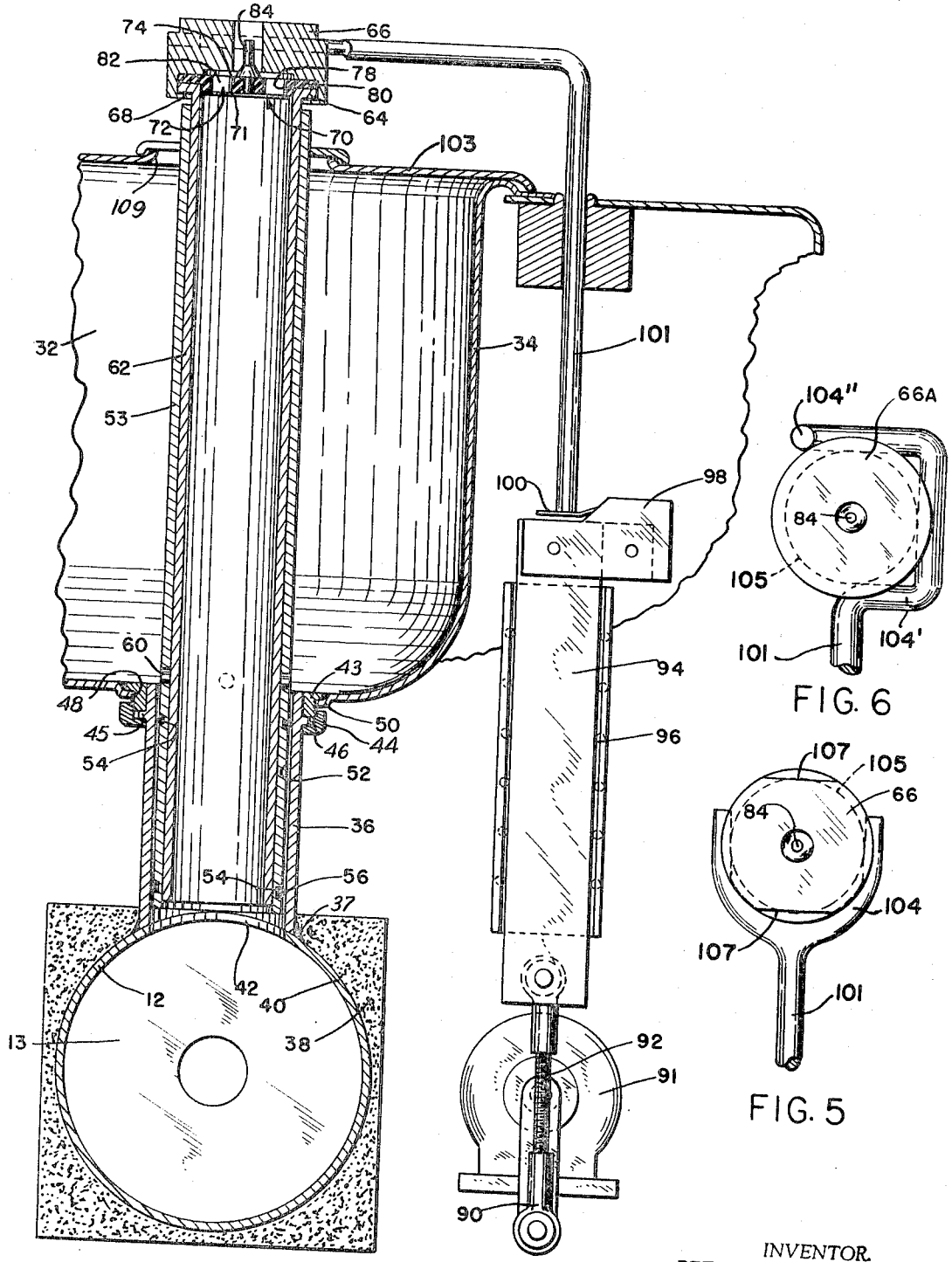

Feb. 21, 1967  P. STRUTYNSKI  3,304,737
AUTOMATIC FILLER FOR ICE CREAM FREEZER
Filed Jan. 10, 1966  4 Sheets-Sheet 4
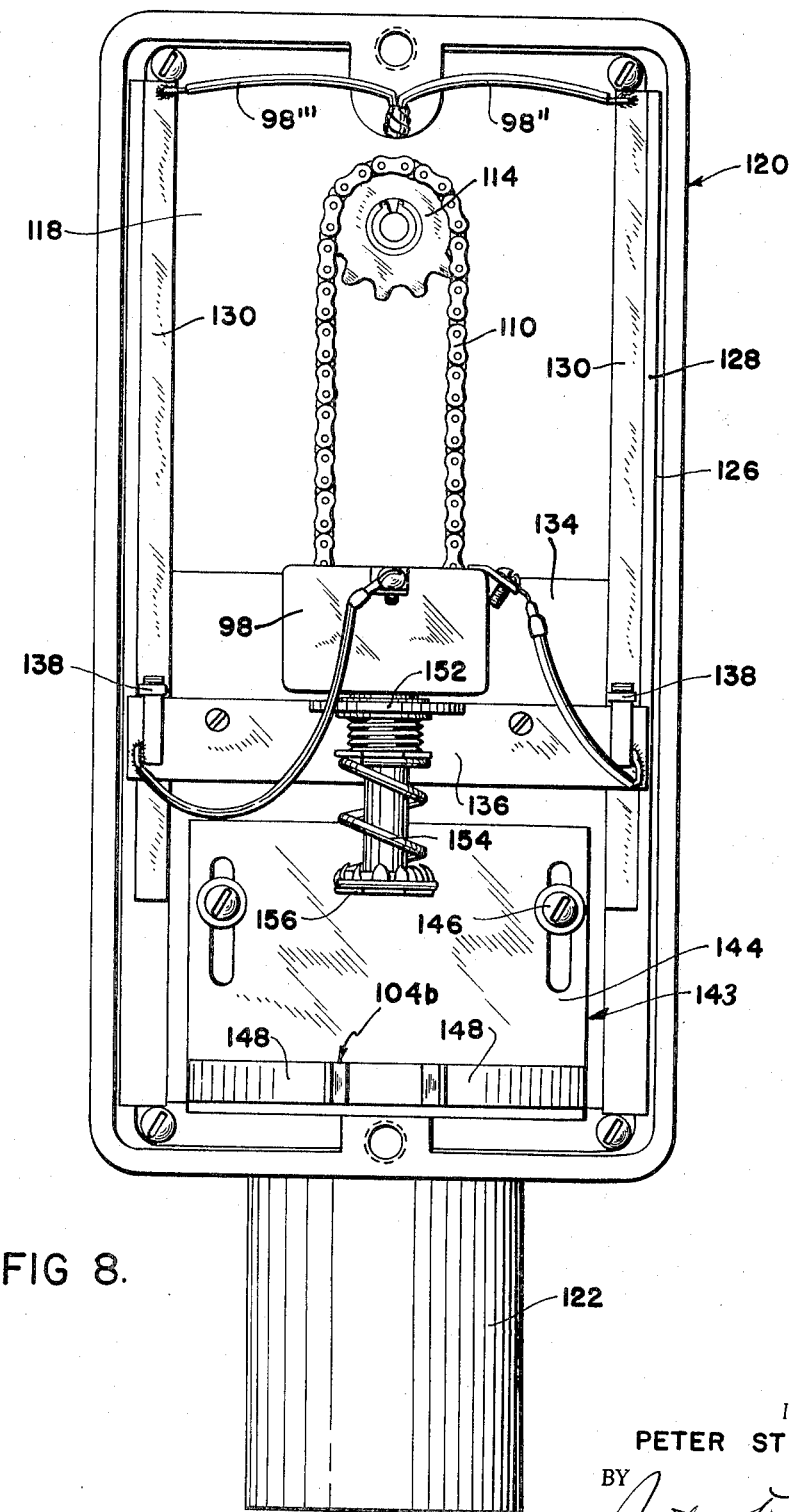
FIG 8.
INVENTOR.
PETER STRUTYNSKI
BY
ATT'Y

United States Patent Office 3,304,737
Patented Feb. 21, 1967

3,304,737
AUTOMATIC FILLER FOR ICE CREAM FREEZER
Peter Strutynski, Chicago, Ill., assignor to The Bastian-Blessing Company, Chicago, Ill., a corporation of Illinois
Filed Jan. 10, 1966, Ser. No. 519,480
11 Claims. (Cl. 62—179)

This application is a continuation-in-part application of application Serial No. 414,955, filed December 1, 1964, now abandoned, reference and incorporation of which is hereby made.

The invention relates generally to an apparatus for whipping and soft freezing fluid comestibles such as confections, custards, and ice cream mixes in a continuous standby operation for intermittent dispensing, and more particularly, to improvements in automatically replenishing the apparatus with correct proportions of liquid mix and air during and following each dispensing operation.

In soft ice cream freezers, by way of example, it is highly desirable to whip a predetermined amount of air into a liquid mix for many well known gustatory reasons. The amount of air present is reflected in an increase in the volume of the ultimate product over the volume of the unwhipped liquid mix primarily present in the product. This increased volume is generally referred to as "percentage of overrun" and is based on the percent of the increase in volume over the liquid mix volume. This addition of air is mainly accomplished by the speed and rapidity of the dasher scraper blades in the freezer passing through an air space maintained at the top of the freezer and captivating the mix to draw and trap bubbles of air in the mix while the dasher is running. Other blades on the dasher further comminute the air bubbles in the mix to accomplish the overrun desired.

However, the ultimate overrun is variable between wide limits depending upon whipping time, temperature, ingredients of the liquid mix, and also variables in the rate and frequency of dispensing. Heretofore, methods and devices for replenishing the freezer compartment with liquid mix have not provided adequate assurance that air expended with the product when dispensed is replenished in the proper proportion with increments of replenishing liquid mix.

A dependable or constant relationship is highly desirable to assure optimum proportions under expected conventional dispensing conditions, and one of the objects of the invention is to provide an apparatus which feeds within close limits the desired proportion of liquid mix and air to the feezer in predetermined increments under identical conditions recurring in a timed relationship.

A further object of the invention is to feed to the freezer chamber predetermined increments of air and liquid mix at atmospheric pressure and in checking the need for supplying further increments of air, liquid mix and whipping time, and then subjecting the freezer to only a low pressure above atmospheric pressure momentarily to make the check.

A further object of the invention is to measure replenishing increments of air and liquid mix at atmospheric pressure and time their recurrent admission to the freezer with the running of the dasher in the freezer, and disposing the freezer at atmospheric pressure during non-replenishing periods of time.

A further object of the invention is to maintain at substantially atmospheric pressure, the air space present in a freezer and only momentarily displaces a small specific amount thereof to repeatedly test the volume thereof by a rise in confined pressure immediately following the addition of each increment of liquid mix to the freezer.

A further object of the invention is to provide a liquid mix and air replenishing apparatus for freezers which is simple in construction, readily disassembled for complete and easy brush cleaning and washing for excellent sanitation within the most rigorous requirements.

These being among the objects of the invention other and further objects will become apparent from the claims and the description which follows of the drawings in which like numbers refer to like parts:

FIG. 2 is an enlarged vertical section taken transversely of the freezer cylinder through the liquid replenishing construction;

FIG. 5 is a plan view of the upper portion of the valve tube showing one embodiment of the disconnect of the valve tube actuator provided for disassembly and cleaning;

FIG. 6 is a plan view similar to FIG. 5 showing a modification of the disconnect construction shown therein;

FIG. 8 is a longitudinal sectional elevation of the embodiment shown in FIG. 7 taken at a right angle to the plane of view in FIG. 7.

The invention contemplates adding liquid mix in small substantially equal increments to a freezer at regular intervals at atmospheric pressure; adding increments of air at atmospheric pressure along with the liquid mix increments; checking the volume of air in the air space remaining in the freezer after each addition at a low pressure resulting from momentary physical reduction of the air space a predetermined fractional amount to time control the length of the replenishing period.

The freezer is normally open to atmospheric pressure and approximately 80% full of liquid mix. When the freezer dasher is started a valve opens momentarily at definite intervals to admit increments of liquid mix to flow successively into the freezer where the beaters whip air into it that is present in the freezer. After each increment is admitted and the valve closes, a preloaded element reduces the air space a fixed amount to momentarily compress the air to a low pressure and to react thereto for determining the air volume remaining therein. Thereupon the cycle is repeated and another increment of liquid mix and air is admitted, until a predetermined test pressure of the air is attained. Thereupon the valve is inactivated as part of the test and atmospheric pressure is again restored to the air space with or without the freezer beaters continuing to run a short period of time under a temperature control. Preferably, the valve actuation is continued during the dispensing operation and slightly beyond same and preferably is instituted with the start of the dispensing operation. The freezer dasher not only runs concurrently with the valve actuation, but may continue thereafter for a predetermined period of time if desired. Furthermore, the valve, the preloaded element and the means for restoring the valve to atmospheric pressure are unitized for constant operational characteristics.

Figure 1:
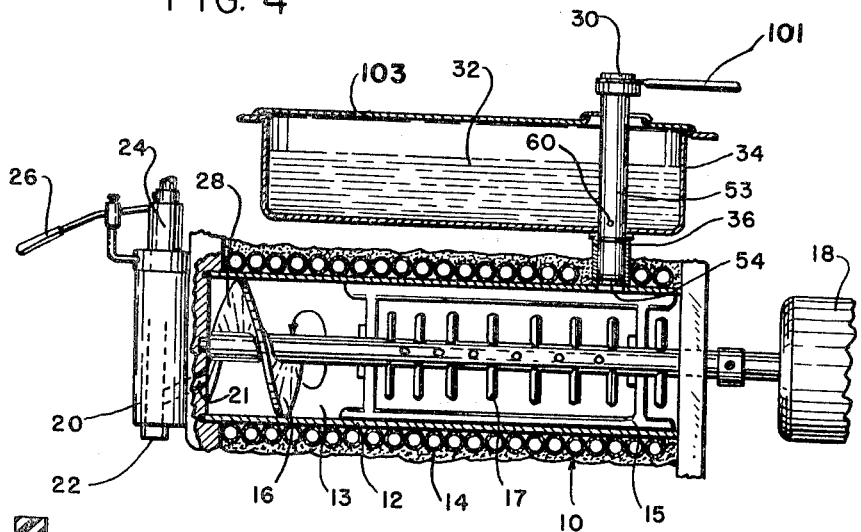
FIG. 1 is a diagrammatic showing of the elements, their organization and cooperation with which the present invention is primarily concerned.

In FIG. 1, the essential components of an intermittently operated dispensing freezer with which the present invention is concerned, is diagrammatically shown at 10. The freezer 10 comprises a freezer cylinder 12 having a freezing chamber 13 provided with a dasher 16 rotatably driven therein by a motor 18 and refrigerated by an expansion coil 14 around the outside thereof. The dasher in turn comprises scraper blades 15 for cavitating the mix, whipping blades 17 for comminuting cavitated air bubbles and an end thrust helical blade 28 at the discharge end for assisting in the dispensing of the confection.

A head 20, removable for cleaning, closes the front end of the cylinder and has a dispensing port 22 controlled by a dispensing valve member 24 closing same that is opened by a manual lever 26 to open the port 22 and dispense therethrough the soft frozen confection from the freezing chamber 13. Reference to the Fraser Patent No. 3,229,476 issued January 18, 1966 is hereby made for further explanation of the dispensing operation.

Suitable temperature responsive controls (not shown) actuate the dasher motor 18 and the necessary expansion of refrigerant in coil 14 to prepare and maintain the soft frozen condition of the mix in the cylinder 12. Intermittently, the lever 26 is manipulated to withdraw the soft-frozen mix, thereby depleting the amount remaining in the cylinder. The dasher 16 is run during withdrawal so that the helical blades 28 on the front end of the dasher provides a constant urge upon the mix to flow through the dispensing port.

In conjunction with the withdrawal of the confection, a replenishing comestible liquid 32 and atmospheric air for overrun are supplied to the cylinder 12 in proper proportions through the valve arrangement 30. The liquid 32 is supplied laterally to the valve from a reserve container 34 and the air to maintain the desired "overrun" in the cylinder 12 is supplied through the top of the valve. The combination air and liquid inlet valve arrangement 30 is powered to feed to the chamber 13 increments of liquid from the liquid 32 stored in the container 34 and air from the atmosphere at regular intervals as long as the liquid in the cylinder is below a predetermined amount and then to shut down.

Referring more particularly to FIG. 2, the container 34 is mounted above the level of the cylinder 12 and is suitably connected thereto at the rear end thereof by a sleeve 36 as by welding 37 at its lower end in sealed relation to the cylinder wall 40 around an inlet opening 42. In making this connection a joint is used in which the bottom of the container has an externally threaded bushing 43, silver soldered to an embossment 50 in an opening 48 to slip over the upper end of the sleeve 36 and come to rest on a flange member 45 integral with the wall of sleeve 36. A coupling nut 44 on the sleeve threadably engages the bushing and an O-ring 46 seals the joint when it is tightened to secure the container in place. The container thereby is demountable for cleaning and the sleeve 36 thereby provides a large, straight conduit means with a passage 52 interconnecting the container and cylinder that can be regularly brush-cleaned quite easily.

A standpipe member 53 telescopes at its lower end into the sleeve 36 as externally provided with circumferential grooves 54 that support O-rings 56 to provide a seal in the space between telescoping portions of the two members. The standpipe is weight supported by ears 58 (FIG. 7) on the standpipe engaging the upper end of the sleeve 36.

At the level of the bottom of the container 34, valve openings or ports 60 are provided through the wall of the standpipe member to control the replenishing drain of liquid 32 from the container to the cylinder 12 at atmospheric pressure. The height of the standpipe is somewhat immaterial as long as it is of substantial length, but it preferably extends to a level at least above the maximum level of liquid 32 in the container 34, to support in telescoping guided relationship a valve member that cooperates with the valve ports 60.

Such a member is shown in FIG. 2 comprising a valve tube 62 which slides freely in telescoping relationship in the standpipe with the lower end thereof in its resting position disposed in close proximity to the cylinder wall whereby there is a substantial overlap of the tube 62 and pipe 53 between the ports 60 and cylinder opening 42, for reasons to be explained.

In the embodiment shown in FIG. 2 the upper end of the valve tube 62 has a segmented circumferential flange defining the male lugs 64 of a bayonet joint and receives cap 66 having female lugs 68 mating therewith. A flapper check valve 70 is received between the top of the tube 62 and the cap 66 and comprises a spider 72 with the hub 74 thereof defining a central opening 76 and a rim portion 78 having a radial flange 80 which is clamped between the tube end 62 and cap 66. A flapper valve element 71 normally closes lightly against the rim 78 and the bottom ends 79 of the spider openings 82 that are provided through the spider. The element 71 is snapped into place in supported relationship by a resilient central snap plug 84 pulled through the opening 76. These two elements are preferably made of neoprene for inherent resiliency purposes and the flapper valve element 71 opens towards the freezer chamber 13 to admit air thereto at the slightest drop of pressure therein below atmospheric pressure.

In FIGS. 1 and 2, means for raising and lowering the tube 62 is provided by a motor 91 and transmission driven crank arm 90 driving a connecting rod 92 that reciprocates a slidable element 94 in a guide 96. A micro-switch 98 is carried on the upper end of the slide element 94 and its actuator arm 100 supports the weight of the tube 62 through an L-shaped rod 101 resting thereon at its lower end and supporting the cap 66 at its upper end. The radius of the crank is sufficient to raise the tube 62 high enough for its lower end to open the ports 60 momentarily and let a predetermined increment of liquid run into the freezer chamber.

The supporting engagement at the cap is demountable so that a cover 103 can be removed when desired. This relationship in FIG. 2 includes a horizontal yoke 104 (FIG. 5) or 104' FIG. 6 at the upper end of the rod 101 which engages in a circumferential groove 105 on the cap 66 or 66A. The forms are illustrated. The yoke 104' in FIG. 6 is pointed laterally to engage in the groove when the rod 101 is rotated about its vertical axis. This engagement in this groove may be had by the yoke 104' being hook shaped with an end portion 104" of one of the fork elements to extend beyond the groove where it is bent up slightly to prevent disengagement during operation. The rod 101 is rotated about its vertical axis to move the yoke laterally into and out of engagement in the groove for purposes to be mentioned. The construction shown in FIG. 5 is one in which the hook opens endwise and is lowered into place over flats 107 on the cap 66 and the valve and cap 66 are quarter turned to establish the engagement beneath segments remaining above the groove. With either arrangement however, when disengaged the cover 103 can be lifted from the container, the opening at 109 being large enough to pass over the cap 66. Otherwise, when filling the container, the container being elongated with the standpipe 53 located adjacent one end and the rod 101 preferably at one side, the cover 103 can be quarter turned about the standpipe 53 when filling is desired without moving the rod 101 of removing the cover 103.

It will be observed that a predetermined increment of liquid 32 is valved into the freezer each reciprocation of the valve tube 62 under substantially atmospheric pressure conditions with the only possible variable being the hydrostatic head of liquid in the container. Where the container is preferably kept filled automatically as by a float valve (not shown), this head is held substantially constant at 4 or 5 inches of water column, but even if manually filled, the head pressure seldom ranges beyond three or four inches of water column.

In the embodiment illustrated the crank arm 90 is rotated at approximately 10 r.p.m. thereby providing a feed cycle to admit a liquid increment every six seconds and the electrical control circuit is designed to run independently of the dispensing operation although the motor 91 may be started near the beginning of each withdrawal of the frozen confection. This is accomplished preferably through an electric circuit by which the overall functions of the freezer are controlled.

Figure 4:
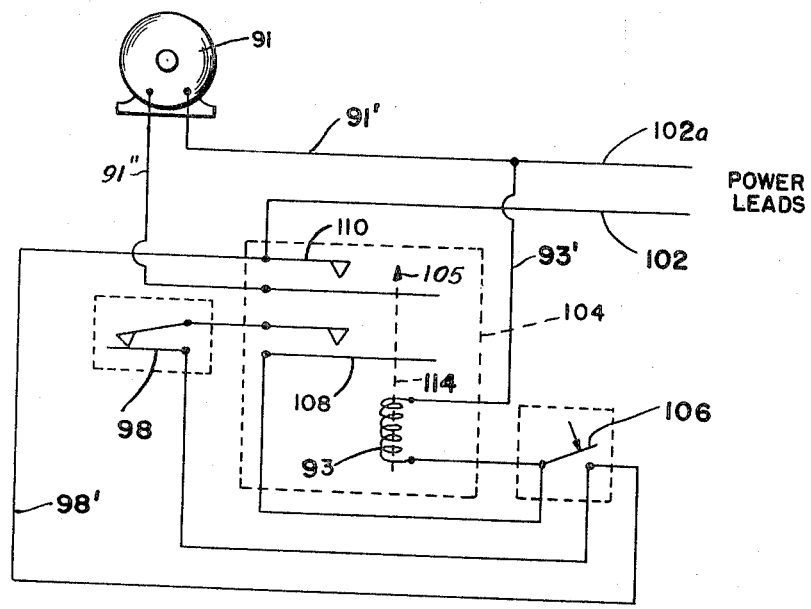
FIG. 4 is a schematic diagram showing the electric circuit controlling the operation of the replenishing apparatus.

Referring to FIG. 4 which is a schematic diagram of the electrical circuit employed, electrical power is derived through power lines 102. This can be any available voltage providing motor 91 and the coil 93 of electro-magnetic relay 114 are designed to use this voltage.

It is seen that one of the lines 102a has a lead 91' to motor 91 through lead 91'' thence to contact 110 of relay 114. When the coil 93 of relay 114 is not energized, this contact will remain open and the motor will not run. The other lead 93' from the one line 102a is connected to one of the terminals of coil 93 of relay 114 and through this coil to one terminal of push switch 106, whose other terminal is connected through line 98' to the other line 102. Thus, it is seen when switch 106 is depressed by the action of dispensing the confection as by the opening of the valve 24, it completes the circuit through coil 93 which then acts in the direction of the arrow 105 to close contacts 110 and 108. The closing of contact 110 completes the circuit to motor 91 which starts running and this, in turn, initiates the reciprocating action of the valve tube 62 through mechanical linkage 90, 92, 94, 98 and 102 as already described.

Figure 7:
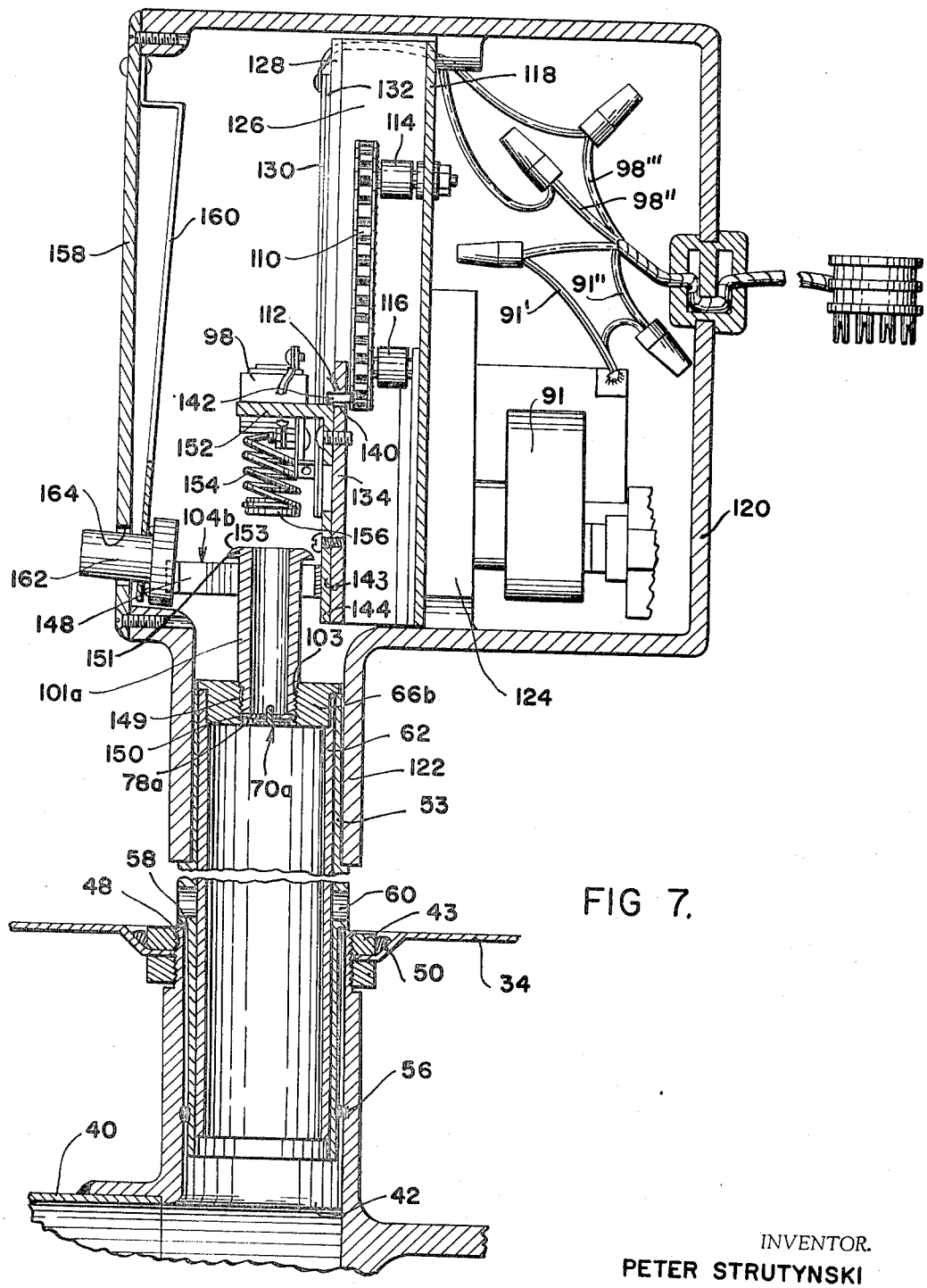
FIG. 7 is a sectional view similar to FIG. 2 showing the preferred embodiment of the invention.

At the same time that contact 106 is closed, a parallel path for the current through coil 93 between lines 102 is also closed. This parallel path leads through microswitch 98 which is normally closed by weight of tube 62 (FIG. 2) or lack of actuation by the tube 62 (FIG. 7). It is seen then that this parallel path will continue to energize coil 93 even if push switch 106 is opened when dispensing action is terminated. When weight of the tube 62 is removed from switch 98 during the momentary compression of the air column, as explained previously, this parallel path will be broken, coil 103 will be de-energized and contacts 110 and 108 will be opened, motor 91 will stop and the reciprocating action of tube 62 will cease.

In operation, with the microswitch 98 closed as it generally is under the weight of the tube 62 in resting position, as shown in FIG. 2, when the gate valve 24 is opened to dispense a frozen confection, the gate valve will close the manual switch 106 and energizes relay 104. The self-holding switch 108 also is closed thereby energizing and maintaining energization of coil 103 and the feed motor 91 to reciprocate the valve tube 62 and also assuring the running of the dasher 16 to move frozen confection out of the dispensing port 22. The dasher motor is further independently controlled by a thermostat and runs when energized in either way.

As the valve tube 62 moves upwardly, the feed chamber therein goes slightly subatmospheric in pressure and air is aspirated thereto through the flapper valve 71 to establish atmospheric pressure therein. In the embodiment illustrated the inside diameters of the standpipe 53 is 1½'' and the slide tube 62 is 1¼''. The slide tube travels about 3''. At its upper limit of travel, the valve ports 60 are uncovered at the lower end of the valve tube 62 and an increment of liquid 32 will flow into the freezer. Then, as the tube starts down it closes the ports and the aspirated air is trapped by closure of the valve 71 and slightly compressed. The pressure goes up with the weight, namely to 18 p.s.i. absolute, i.e., 3 p.s.i. gauge as confined by the tube. The weight of the tube 62 and arm 102 is approximately 2.6 pounds, and can be varied, and with its length being 12 inches the maximum air pressure momentarily developed is approximately one pound gauge pressure to "float" the tube. If the pressure developed is not yet great enough to support the weight of the tube at its lower point of movement and thereby open the microswitch 98, the cycle will repeat itself until enough liquid has been admitted that the air space is reduced and the pressure developed as a result is enough to float the tube momentarily adjacent its lowest point of excursion whereupon the microswitch 98 is free to open and the relay 104 is thereby de-energized, stopping the motor 91.

It will be appreciated that the motor 91 stops under these conditions leaving a positive gauge pressure in the chamber with the tube near the bottom of its excursion. However, the clearance between the tube 62 and the inside wall of the standpipe 53 is great enough to provide easy reciprocation with little friction, and also to bleed the air pressure through the ports 60 down to the hydrostatic pressure of the liquid 32 at that level. Preferably, this is done within a fraction of a minute in order to drop the tube 62 enough to close the microswitch again within two or three seconds for a ready resting condition of the device. However, it will be observed that regardless of whether or not the micro-switch has closed, the motor 91 is actuated by a closing of switch 106 each time dispensing is begun whereupon the micro-switch closes with the resumed activity of the tube 62 for purposes and operations described without any need for delay between dispensing operations.

The pressure drops to the hydrostatic pressure in approximately 15 seconds and thereafter the freezer in resting condition is substantially at atmospheric pressure. All that is required of this pressure function is a momentary opening and closing of the microswitch to stop the motor 91 and arrest the filling operation. Thereupon, when the motor 91 stops the freezer is fully readied for a repeat dispensing operation and this can be adjusted by the length of the connecting rod 92 with respect to the height of the lift desired for the valve tube.

Moreover, in event the "overrun" is to be changed, one or both of two things may be done. Either the excursion range of the valve tube 62 can be lowered or its weight lightened to increase the overrun, or, the converse can be done to decrease the overrun.

Furthermore, it will be seen that the cap 66 can easily be removed at any time when it is desirable to introduce solids such as nuts, hard candy chips, or pieces of fruit into any particular confection, and to do this at any time. While the cap is off the bayonet joint elements 64 will support the tube against dropping into the freezer cylinder. Thereafter the cap is returned and the rod 101 slipped back into its operative position in the groove 105.

Referring with further particularity to FIGS. 7 and 8, the reciprocation of the valve tube 62 is accomplished by a sprocket chain 110 driving a Scotch yoke 112 transmission. The sprocket chain is carried by vertically spaced upper and lower sprocket wheels 114 and 116, respectively, that are journalled on a flanged support 118. The support is removably mounted in a housing 120 rearwardly of a downwardly extending tubular pedestal 122. The lower sprocket-wheel 116 is propelled by the motor 91 through an attached speed reduction transmission 124 that is secured to the back of the support 118.

The side flanges 126 terminate forwardly in inwardly turned edges 128 upon which are mounted elongated electrically conductive slide tracks 130 insulated by an intermediate strip of insulation 132. A carrier 134 slidably engages the back sides of the turned edges 128 in vertically guided relationship as held by an insulated retainer member 136 which in turn has electrically isolated rollers 138 engaging said tracks 130 in electrically conductive relationship.

The Scotch yoke 112 comprises a cross slot 140 in the carrier 134 which serves as a crosshead for this purpose and the pin 142 is secured to the sprocket chain and carried thereby in the path of its movement to raise and lower the valve tube 62 by means of a lift bracket assembly 143 carried by the crosshead which includes a carrier plate 144 vertically adjustable on the carrier 134 as by clamp screws 146. A U-shaped blade member 104b is secured to the carrier plate at its base with the arms 148 extending forwardly and towards each other so that they lift in a vertical direction and flex in a horizontal direction.

Figure 3:
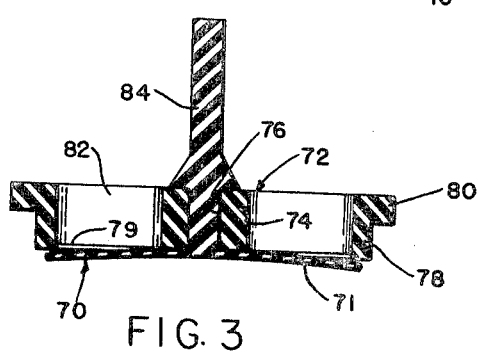
FIG. 3 is an enlarged view of the upper portion of the valve tube shown in FIG. 2.

The arms 148 cooperate with each other below the head 151 of a tubular lift screw 101a which is threaded into an opening 103 in a cap 66b that closes the upper end of the valve tube 62. The threaded relationship is such that the female thread 149 on the cap ends in an inward flange 150 at the bottom of the opening 103. The flange supports the peripheral edge of a miniaturized version 70a of the flapper check valve 70 (FIG. 3) already described. The lower end of the lift screw clamps the peripheral rim portion 78a in place for its purpose for operation of the check valve as already described. The head 151 is marginally founded at 153 in order to cam outwardly the arms 148 to let the head pass if it moves upwardly from below them. When above the arms, the head along with the valve tube 62 is positively carried upwardly by the arms. Upon the downstroke of the arms a lost motion action is permitted between the head and arms which permits the valve tube 62 to merely follow the arms downwardly whereby the head 151 may be supported by pressure in the cylinder 40 while the arms continue downwardly by action of the sprocket chain and Scotch yoke.

A bracket 152 is secured to the front face of the carrier 134 to support the microswitch 98 in axial alignment with the head 151 of the lift screw 101a and a depending lost motion spring 154 is provided having an end button 156 which on its downward movement engages the head 151 if the valve tube 62 does not move to its lowest limit of movement as when it floats on pressure trapped therein as already described. Upward displacement of the button 156 by the head 151 moves the spring and actuates the normally closed microswitch to break the motor 91 circuit between the contact tracks 130 in accordance with the intended operation of the electrical circuit as already described.

The front opening in the housing 120 is closed by a cover 158 and on the inner face thereof is secured a leaf spring 160 which carries a release button 162 that coincides with the level of the ends 148 of the U-shaped lift arms 104b when they are in their lowest position. The button is exposed through an opening 164 in the cover for manual actuation and when actuated spreads the arms 148 far enough that the head 151 is released from engagement therewith. Then when the cover 158 is removed, the housing 120 can be lifted with its pedestal 122 from its supported working position on the standpipe 53, to clear all comestible contacted parts for ready disassembly, cleaning and reassembly.

Having thus described the invention, its operation and advantages, and one of its embodiments associated with a 4″ freezer cylinder 16 ″ long, it will be apparent how the various objects and advantages are attained, and particularly how the parts can be readily disassembled for brush cleaning a liquid contacting surface, and how various adjustments and modifications may be made without departing from the spirit and concept of the invention, the scope of which is commensurate with the appended claims.

What is claimed is:

1. In a dispensing freezer having a freezing chamber with a dasher to whip and freeze therein a soft frozen mix of comestible liquid and air, the combination of a dispensing valve for the chamber at one end thereof, a storage container for reserve liquid, conduit means interconnecting the chamber and container in open communication for conducting reserve liquid to the chamber to replenish the mix dispensed through said valve, standpipe means removably supported on said conduit means in sealed relationship therewith extending at its upper end above the level of reserve liquid in the container and having a valve port adjacent to the bottom of the container for draining reserve liquid into the chamber through said conduit means, a valve tube means slidable in said standpipe having a lower end in its resting position extending well below the valve port in valve port closing relationship and terminating above said freezer chamber, valve means at the top of the valve tube for admitting air to said valve tube at atmospheric pressure, means for reciprocating the valve tube between its resting position and a retracted position opening said valve port, said reciprocating means including an element stopping said reciprocating means when the valve tube fails to reach its resting position at the end of reciprocation excursion therefrom.

2. The combination called for in claim 1 in which said reciprocating means includes vertically spaced sprocket gears, an endless sprocket chain driven thereby, carrier means reciprocated vertically by the sprocket, lift means interconnecting said carrier means and said valve tube for raising said valve tube to its retracted position, and yielding means carried by said carrier means actuating said stopping element when said valve tube means fails to reach its resting position.

3. The combination called for in claim 1 in which said reciprocating means includes an electrical motor, electrical slide contact elements connected in circuit with the motor, and switch means bridging said slide contact elements actuated by said stopping element.

4. The combination called for in claim 1 in which said standpipe means has a stop means on it removably supporting said valve tube reciprocating means, and said valve tube reciprocating means includes a releasable lift means for disengaging said valve tube when said reciprocating means is removed from said supported relationship on said standpipe means.

5. The combination called for in claim 1 in which said valve tube includes a cap having a threaded opening therethrough terminating at the bottom in a flange, and a lift screw sleeve threaded into the opening, said flange and said sleeve holding said valve means in clamped sealed relationship in said cap, said cap having a flange engaging the top of said standpipe means.

6. In a soft ice cream freezer having a freezing chamber with dashers to whip therein a soft frozen mix of comestible liquid and air, the combination of a dispensing gate for the chamber at one end thereof, a storage container for reserve liquid above said chamber, conduit means interconnecting the chamber and container in open communication, stand pipe means removably supported in said conduit means in sealed relationship therewith extending and having a valve port adjacent the bottom of the container for draining reserve liquid to the chamber to replenish the mix dispensed through said gate, a hollow valve tube slidable in said stand pipe closing said valve port in its resting position, valve means for admitting air to said valve tube at atmospheric pressure, means for repeatedly reciprocating the valve tube in a cycle momentarily opening said valve port and subsequently trapping and compressing said admitted air to measure the amount of liquid in said freezer, an element controlled by said tube for stopping said reciprocating means when the valve tube is momentarily held by the compressed air enough to prevent completion of its reciprocation.

7. In an ice cream freezer having a freezing chamber with dashers to whip therein a soft frozen mix of comestible liquid and air, the combination of a gate for the chamber at one end thereof for dispensing soft frozen mix, a storage container for reserve liquid, means for metering replenishing liquid and air to the chamber to replace the mix dispensed through said gate including a conduit member interconnecting the chamber and container having a valve port adjacent the bottom of the container for draining reserve liquid into the chamber, a valve tube reciprocably mounted in said conduit member to open and close said valve opening at one limit of its reciprocation, valve means at the top of the valve tube for admitting air to said valve tube at atmospheric pressure, means for reciprocating the valve tube, said valve tube compressing admitted air as it approaches the other limit of its reciprocation, means including an element stopping said reciprocating means when the valve tube momentarily fails to reach said other limit of reciprocation, and means for bleeding compressed air rapidly from the valve tube to bring the valve tube to its other limit of reciprocation and deactivate said stopping element.

8. In an ice cream freezer having a freezing chamber with dashers to whip therein a soft frozen mix of comestible liquid and air, the combination of a dispensing gate for the chamber at one end thereof, a storage container for reserve liquid disposed above said freezing chamber, conduit means interconnecting the chamber and container in open communication for conducting a flow of reserve liquid by gravity to the chamber to replenish the mix dispensed through said gate, valve means removably supported in said conduit means in sealed relationship therewith for controlling said flow of reserve liquid including a valve port adjacent the bottom of the container and a valve element reciprocable to open and close the valve port at one limit of its reciprocation, a valve member for admitting air to said freezing chamber at atmospheric pressure, means for reciprocating the valve element to compress momentarily the air in said freezing chamber and oppose reciprocation of the valve element, switch means controlling the operation of said reciprocating means, activated by said reciprocating means when said valve member is held from reaching its other limit of movement by said compressed air to stop said reciprocating means, means for rapidly reducing the pressure of said compressed air to deactivate the switch means, and switch means actuated by opening movement of said gate for starting said reciprocating means.

9. The combination called for in claim 1 in which said removable valve means includes a closure cap, releasable means interengaging said closure cap and reciprocating means, and a cover for said storage container constructed and arranged for removal from the container past said closure cap.

10. The combination called for in claim 1 including an element on said removable valve means having a circumferential groove at the top thereof, yoke means carried by said reciprocating means engaging said removable valve means in said groove and movable laterally from the path of movement of said removable valve means.

11. In a dispensing freezer having a freezing chamber with a dasher to whip and freeze therein a soft frozen mix of comestible liquid and air, the combination of a dispensing valve for the chamber at one end thereof and said dasher propelling the soft frozen mix out of the dispensing valve, a storage container for reserve liquid, conduit means interconnecting the chamber and container in open communication at the other end thereof for conducting reserve liquid to the chamber to replenish the mix dispensed through said gate, stand pipe means removably supported in said conduit means in sealed relationship therewith extending at its upper end above the level of reserve liquid in the container and having a valve port adjacent the bottom of the container for draining reserve liquid into the chamber, a valve tube slidable in said stand pipe open straight through to said freezer and having a lower end in its resting position extending below the valve port in valve port closing relationship, removable valve means at the top of the valve tube for admitting air to said valve tube at atmospheric pressure, said valve being removable to admit solid ingredients through the valve tube into the chamber for mixing with the comestible liquid therein, means detachably engaging said removable valve means for reciprocating the valve tube between its resting position and a retracted position opening said valve port with said valve means in place to compress air in said tube and freezer under the weight of said valve tube, said reciprocating means including an element stopping said reciprocating means when the valve tube fails to reach its resting position at the end of a reciprocation excursion therefrom.

References Cited by the Examiner

UNITED STATES PATENTS

| | | | |
|---|---|---|---|
| 2,515,722 | 7/1950 | Maranz | 62—343 |
| 2,523,853 | 9/1950 | Woodruff | 62—342 X |

FOREIGN PATENTS 234,715  9/1959  Australia.

ROBERT A. O'LEARY, *Primary Examiner.*

W. E. WAYNER, *Assistant Examiner.*